United States Patent [19]

Berkovich

[11] 3,903,239

[45] Sept. 2, 1975

[54] RECOVERY OF TITANIUM DIOXIDE FROM ORES

[75] Inventor: Serge A. Berkovich, Oakville, Canada

[73] Assignee: Ontario Research Foundation, Sheridan Park, Canada

[22] Filed: Apr. 1, 1974

[21] Appl. No.: 456,987

Related U.S. Application Data

[63] Continuation-in-part of Ser. No. 330,230, Feb. 7, 1973, abandoned.

[52] U.S. Cl. .................. 423/82; 423/140; 423/493; 423/610; 423/611; 423/633; 75/101 R; 204/96

[51] Int. Cl.² .................. C01G 23/04; C01G 23/06

[58] Field of Search .............. 423/82, 610, 611, 612; 75/101 R

[56] References Cited

UNITED STATES PATENTS

| | | | |
|---|---|---|---|
| 2,337,215 | 12/1943 | Von Bichowsky | 423/612 |
| 3,529,931 | 9/1970 | Moklebust | 75/101 R X |
| 3,597,190 | 8/1971 | Grohmann et al. | 75/101 R |

FOREIGN PATENTS OR APPLICATIONS

| | | | |
|---|---|---|---|
| 574,818 | 1/1946 | United Kingdom | 423/612 |

OTHER PUBLICATIONS

"Titanium," by Jolks Barksdale, 2nd Ed., 1966, pp. 373, 374, 377, The Ronald Press Co., New York.

Primary Examiner—Edward Stern
Attorney, Agent, or Firm—Sim & McBurney

[57] ABSTRACT

Titanium dioxide is recovered from ilmenite in high purity and high yield. The ore is leached with concentrated hydrochloric acid at room temperature to dissolve at least 80% of the titanium and iron values of the ore and to leave gangue material substantially undissolved. After separation from solid gangue material and conversion of ferric iron to ferrous iron, the titanium chlorides are hydrolyzed and titanium oxyhydrate is precipitated. A substantial proportion of the ferrous chloride may be removed from the solution by crystallization prior to the hydrolysis of the titanium chlorides. The titanium oxyhydrate, after separation from the mother liquor, and purified, if necessary to remove traces of ferric materials, is dried and converted into substantially pure pigment grade titanium dioxide. The iron values may be recovered from the mother liquor and a closed hydrochloric acid cycle may be established.

23 Claims, 2 Drawing Figures

3,903,239

RECOVERY OF TITANIUM DIOXIDE FROM ORES

REFERENCE TO RELATED APPLICATION

This application is a continuation-in-part of application Ser. No. 330,230 filed Feb. 7, 1973, now abandoned.

FIELD OF INVENTION

The present invention relates to the recovery of titanium dioxide from ores, particularly ilmenite.

BACKGROUND TO THE INVENTION

Many processes are known for the recovery of titanium dioxide from ores. Ilmenite, which contains mainly titanium oxide and iron oxide values, often is employed in such recovery processes to provide the titanium dioxide. The majority of such recovery processes involve digestion of the ore in a mineral acid, such as hydrochloric acid or sulphuric acid, to remove at least the titanium values from the ore. In such processes, however, the purity of the titanium dioxide produced is about 90 to 95%, and hence further purification procedures are required to produce a pigment grade product, adding considerably to the cost of the product.

By utilizing the process of the present invention, it is possible to recover substantially pure pigment grade $TiO_2$ and hence the product does not require further processing to provide a pigment grade material.

SUMMARY AND GENERAL DESCRIPTION OF INVENTION

The process of the present invention comprises contacting ilmenite ore or a concentrate thereof in particulate form with concentrated hydrochloric acid at a maintained temperature of from about 15 to 30°C to solubilize and leach from the ore at least 80%, preferably at least 95%, of the iron and titanium values therefrom. This leaching operation may be carried out in any convenient manner, preferably using countercurrent flow or a procedure in which the hydrochloric acid is passed in a closed cycle loop continuously through a bed of the ore. The leaching operation may be carried out over an extended period of time, typically from 3 to 25 days, depending on the technique employed and the quantity of iron values it is desired to recover.

The leaching operation is exothermic and the reactants are maintained within the temperature range of about 15 to about 30°C, by cooling, if necessary.

The ilmenite or similar ore used in the process of the invention may be treated as such, or may be beneficiated to form a concentrate in any desired manner. Ilmenite generally contains $TiO_2.FeO$ with varying amounts of $Fe_2O_3$ and gangue materials, usually silicates, alumina, lime and magnesia. Beneficiation generally is employed when the ilmenite ore is of low $TiO_2$ content. The starting material, whether it is the ore or a concentrate thereof, preferably has a $TiO_2$ content of at least 30% by weight.

Following the leaching operation, the solution is separated from the gangue material in any convenient manner, typically by filtration. Due to the operation of the leaching step in accordance with the present invention with concentrated hydrochloric acid at a temperature approximately room temperature only small amounts of gangue elements, generally less than 1% of the total gangue, are solubilized and hence are present in the liquid only in small quantities.

In contrast, in prior art systems using concentrated hydrochloric acid, elevated temperatures, typically around 55 to 65°C, and short reaction times, typically from a few hours to a day, have been employed which results in the subsequent deposition of titanium dioxide, which thereby is contaminated with the original gangue elements of the ore. Additionally, since it is unnecessary to heat the hydrochloric acid in the process of the present invention, the cost involved in heating the acid is eliminated.

Further, prior art systems for the recovery of titanium dioxide from ilmenite almost universally have employed very fine grinds of ore, typically 95 to 100% 325 mesh, to enhance the ability of the acid to remove, in particular, the iron from the ore. A very fine grind of this order of magnitude involves the use of expensive grinding procedures, adding considerably to the ultimate cost of the titanium dioxide products. In complete contrast, the leaching step of the process of the present invention operates satisfactorily, removing upwards of 95% of the titanium and iron values of the ore, on much coarser grinds of ore, typically 90 to 95% 100 mesh and less than 50% 325 mesh. The grinding operation required to provide the coarser mesh particles is much less expensive than that required to provide the 95 to 100% 325 mesh particles utilized in the prior art processes.

In addition, where an ore concentrate is used to provide the $TiO_2$ regrinding following beneficiation is unnecessary in the present invention, in contrast to the prior art techniques where finely-ground particles are required.

The quantity of hydrochloric acid used in the leaching step preferably is in an amount equivalent to 2 moles of acid for each mole of ferrous iron, 3 moles of acid for each mole of ferric iron and 4 moles of acid for each mole of titanium present in the ore or concentrate. The liquor resulting from the leaching step, following separation of gangue materials therefore consists predominantly of a solution of ferrous chloride, ferric chloride and titanium chlorides. The use of a substantial excess of concentrated hydrochloric acid generally is avoided in order to reduce the quantity of material to be treated and cycled. In addition, the presence of such an excess of acid may cause problems in the hydrolysis step outlined below.

The ore or concentrate may be pretreated prior to contact with the concentrated hydrochloric acid to increase the rate of dissolution of the titanium and iron values during the leaching step. Such pretreatment may include an initial oxidation at elevated temperature, such as from 600 to 1000°C, in the presence of air and/or oxygen to split the bond between the $TiO_2.FeO$, followed by reduction of at least part of the iron oxide with carbon or carbon monoxide.

Before proceeding to the next stage of the process, it is necessary to convert any ferric iron present in the solution to ferrous iron, in any convenient manner. Typically, the reduction of the ferric iron in the leach liquor may be achieved using a gaseous reducing agent, such as sulphur dioxide which is passed through the leach liquor while the latter is maintained at an elevated temperature, typically around 60°C. The conversion of ferric iron to ferrous iron in this manner is essential in view of the affinity of titanium dioxide for ferric iron and the difficulty in separating ferric iron from titanium dioxide. It is possible that the ilmenite ore or concentrate may be substantially free from ferric iron, in which case, of course, the treatment with a reducing gas may be omitted.

The reduction of the ferric iron to ferrous iron also may be achieved by the addition of metallic iron, in finely divided form, to the leach liquor, which is maintained at an elevated temperature, typically 50 to 90°C, generally around 60C, to convert the ferric chloride to ferrous chloride in accordance with the equation:

$$2FeCl_3 + Fe \rightarrow 3FeCl_2$$

The quantity of metallic iron powder used is at least, and preferably is substantially, stoichiometric to the quantity of ferric iron present, in accordance with the above equation. A small excess, typically up to about 10%, of metallic iron may be used in order to reduce also a small quantity, typically less than 1%, of the quatravalent titanium to trivalent titanium. In view of the greater affinity of trivalent titanium for oxidation as compared to ferrous iron, the presence of a small quantity of trivalent titanium in the solution decreases the tendency for ferrous irons later to oxidize to ferric which may cause contamination of later-formed titanium dioxide.

Following the reduction with metallic iron, the resulting solution may be cooled from its elevated temperature causing crystallization of ferrous chloride. A large proportion of the ferrous iron content of the leach liquor may be removed in the crystallization step, typically above about 75% of the total ferrous iron content of the solution. In addition, since the ferrous chloride is crystallized as the dihydrate, a considerable volume of the total water is removed as water of crystallization. In a typical operation, about 25% of the bulk of the leach liquor is removed as water of crystallization, upon crystallization of the ferrous chloride.

This embodiment of the invention, therefore, wherein metallic iron is used to reduce the ferric iron at elevated temperature and a substantial proportion of the ferrous iron content of the resulting solution is crystallized as ferrous chloride dihydrate, has considerable advantages in decreasing the quantity of liquid to be handled.

The solutiion of titanium chlorides and ferrous chloride, which may contain minor quantities of gangue metal chlorides, typically calcium and magnesium materials, thereafter is mixed with water to cause hydrolysis of the titanium chlorides. A seeding amount, generally about 1 to 2%, by weight of the titanium oxyhydrate to be precipitated of solid titanium oxyhydrate ($2TiO_2.3H_2O$) is included in the mixture, and titanium oxyhydrate precipitates from the mixture.

The seeding quantity of solid titanium oxyhydrate generally is incorporated into the mixture by adding the required amount to the water prior to mixing with the leach liquor. Any other convenient manner of inclusion of the seeding material in the mixture may be adopted.

The hydrolysis is carried out using a quantity of water at least sufficient to precipitate substantially all of the titanium values from the solution but insufficient to cause precipitation of other metal oxides or hydroxides. Where the leach liquor is subjected to reduction, using a reducing gas to convert ferric iron to ferrous, generally an atmosphere of the reducing gas is maintained during the hydrolysis and precipitation steps, to inhibit the reconversion of ferrous iron to ferric iron. Where the reduction was carried out using metallic iron, the presence of the small quantity to trivalent titanium generally is sufficient inhibition of the formation of ferric iron.

The hydrolysis typically is carried out by mixing from about 1 to about 3 volumes of water with each volume of leach liquor. In this way the pH of the hydrochloric acid content of the liquor is maintained below the level above which substantial deposition of other metal oxides, arising from the iron and gangue metal chlorides present in the leach liquor, occurs. Hence, the dilution of the leach liquor to a pH of about 0 to about 0.5 results in the deposition of substantially all of the titanium values while at the same time inhibiting the deposition of other metal hydroxides.

By controlling the dilution step in this way, therefore, the present invention is able to recover titanium values from the leach liquor and deposit substantially pure titanium oxyhydrate. Hydrochloric acid is reformed in an amount equivalent to the quantity used to form the titanium chlorides from the ore.

Where reduction of ferric iron to ferrous iron with a reducing gas is to be carried out prior to the precipitation, it is preferred to heat the leach liquor to about 60 to 75°C and maintain a sulphur dioxide atmosphere in contact therewith, for a time sufficient to convert the ferric iron to ferrous, typically about 30 minutes. The water also is heated to this temperature and maintained thereat under a sulphur dioxide atmosphere until addition of the seeding material, just prior to mixing. Thereafter, the mixture may be heated to a temperature of about 80 to 100°C, preferably about 95°C. This procedure results in the formation of a coarser, and hence a more readily separable precipitate. Precipitation of all of the titanium values of the leach liquor usually is complete in about 1 hour.

Following the separation of the titanium oxyhydrate precipitate from the mother liquor, the precipitate is washed substantially free of entrained mother liquor and dried. Traces of ferric iron may be present, usually about 100 to 200 ppm, and these may be removed in conventional manner, typically by leaching using hydrochloric acid in the presence of zinc or aluminum.

The precipitate then is converted at an elevated temperature, typically from 700 to 1000°C, preferably about 850°C, in the presence of air and/or oxygen into the anatase or rutile form of $TiO_2$. The crystalline form of the $TiO_2$ formed depends on temperature of conversion, and the manner of precipitation of the titanium oxyhydrate.

The titanium dioxide recovered from the ilmenite ore by this procedure is substantially pure (in excess of 99% $TiO_2$) and is of pigment grade. The product obtained, therefore, is of much improved quality as compared to prior art techniques, which produce materials having 90 to 95% $TiO_2$ content, and hence require further purification to produce pigment grade material.

The mother liquor resulting from the precipitation of the titanium oxyhydrate, together with the washings from washing and any purification of the precipitate, then is subjected to a procedure for the recovery of iron and chloride values therefrom. In one procedure which may be carried out when ferrous chloride is not removed prior to the hydrolysis step, the mother liquor is subjected to electrolytic oxidation in any convenient manner, resulting in precipitation of iron from the electrolyte, generally in the form of ferric oxide, and formation of hydrochloric acid. Thus, in this procedure, substantially all of the hydrochloric acid used in the leaching step is reformed, first in the hydrolysis of the titanium chlorides and then in the electro-oxidation. The iron oxide is separated from the regenerated hydrochloric acid.

The quantity of HCl in the regenerated hydrochloric acid is substantially that present in the concentrated hydrochloric acid used to leach the ore. Any small losses of HCl-values which occur in the system may be made up by the addition of fresh hydrochloric acid.

The hydrochloric acid recovered after separation of the ferric oxide may contain minor contaminants, such as gangue metal chlorides. To provide a cyclic system with a closed hydrochloric acid loop, gangue metal chlorides are removed. This may be achieved by flashing off substantially all of the HCl from the hydrochloric acid, leaving behind the gangue metal chlorides, collecting the hydrogen chloride and forming the same into hydrochloric acid for feed to the leaching step.

The iron values of the mother liquor may be precipitated in the electro-oxidation step substantially as pure ferric hydroxide. Following separation from the regenerated hydrochloric acid, the ferric hydroxide may be dried and converted to ferric oxide in conventional manner, typically by heating to about 1000°C.

In the embodiment wherein a substantial quantity of the ferrous chloride is removed from the leach liquor prior to the hydrolysis step, the mother liquor may be fed, together with the previously separated ferrous chloride to a conventional high temperature oxidizing reactor wherein iron oxide, mainly in the form of $Fe_2O_3$, is formed and hydrogen chloride is given off in gaseous form. The iron oxide may be contaminated with small quantities of gangue metal oxides formed from any gangue metal chlorides in the leach liquor.

The gaseous hydrogen chloride, corresponding generally to the quantity utilized in the original leach, may be formed into concentrated hydrochloric acid for recycle. Fresh quantities may be added to make up losses.

The ferric oxide recovered is a commercially-valuable high grade material and may be used to prepare iron pellets or agglomerates suitable for either blast furnace or direct reduction fuel, or the like.

DESCRIPTION OF PREFERRED EMBODIMENTS

Figure 1:
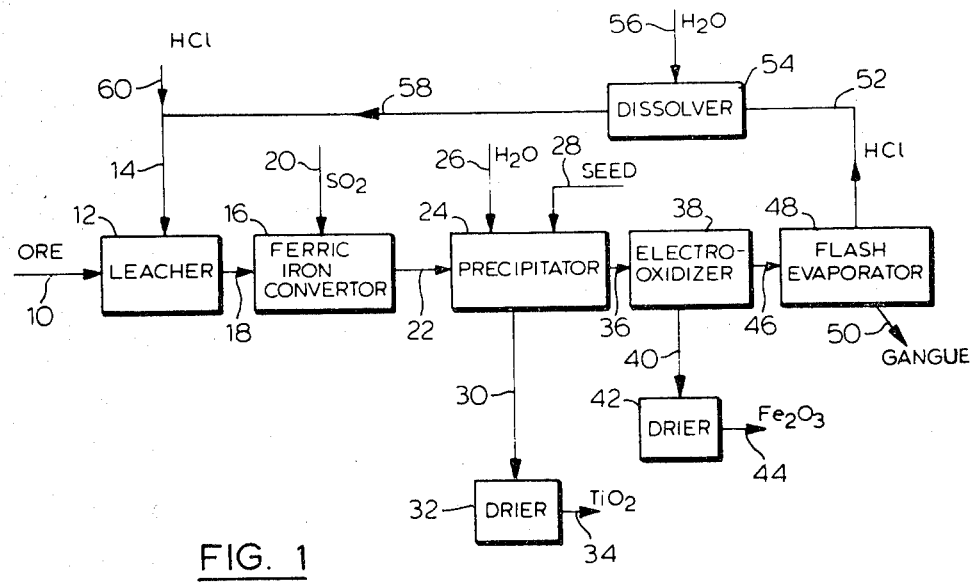
FIG. 1 is a schematic flow sheet of one embodiment of the invention.

Referring first to FIG. 1, ilmenite ore, which may be concentrated and/or pretreated, is fed in particulate form, typically having a particle size of about 90 to 95% 100 mesh less than 50% 325 mesh, by line 10 to a leacher 12 of any convenient construction to allow contact between the particulate ore and concentrated hydrochloric acid, typically of concentration from 35 to 37% HCl, fed to the leacher by line 14. The quantity of hydrochloric acid fed by line 14 is at least sufficient to provide 2 moles of HCl for each mole of ferrous iron, 3 moles of HCl for each mole of ferric iron and to provide 4 moles of HCl for each mole of titanium in the ore.

The leaching is carried out at substantially room temperature, with cooling if required to maintain that temperature, for a time sufficient to dissolve preferably at least 95% of the titanium and iron values of the ore, the resulting aqueous solution of ferrous and ferric chlorides and titanium chlorides, after separation from gangue materials, passing from the leacher 12 to a ferric iron converter 16 by line 18.

The leach liquor in the ferric iron converter 16 is treated with sulphur dioxide, or other reducing gas, fed by line 20 to convert substantially all of the ferric iron content of the leach liquor to ferrous iron. The converted solution, consisting predominantly of ferrous chloride and titanium chlorides, then is fed by line 22 to a precipitator 24. Generally, the ferric iron converter 16 and the precipitator 24 are a single vessel with the sulphur dioxide being maintained in the two steps, but two vessels are shown for ease of illustration.

The converted solution is mixed in the precipitator 24 with water fed thereto by line 26 to cause hydrolysis of titanium chlorides to titanium oxyhydrate. A seeding quantity of titanium oxyhydrate is added to the mixture in the precipitator 24 by line 28. Preferably, the seeding material is added with the water in line 26.

Prior to mixing of the converted solution and the water, both generally are heated to a temperature of at least 60C prior to mixing and thereafter to a temperature of about 95 to 100C, to promote the precipitation of a coarse product. The titanium oxyhydrate precipitate is separated from the mother liquor in any convenient manner, such as filtration, washed to remove entrained mother liquor, and removed from the precipitator 24 by line 30.

The dilution of the aqueous solution in the precipitator 24 is carried out so that the pH of the solution is conducive to deposition of titanium oxyhydrate but inhibits the deposition of other metal compounds.

The titanium oxyhydrate passes by line 30 to a drier 32 wherein the material first is dried and then is converted by heating at a temperature of about 700 to 1000C to pigment grade anatase or rutile $TiO_2$, which is recovered by line 34. The product titanium dioxide recovered from the ilmenite ore in this way is at least 99.5% pure $TiO_2$, is of pigment grade and therefore requires no further processing. Hence, the comparatively long leaching period used in the process of the present invention is more than compensated for by the production of a substantially pure product, the elimination of further expensive processing steps, the savings in heat costs and the savings in grinding costs.

The mother liquor from the precipitation of the titanium oxyhydrate is passed by line 36 to an electro-oxidizer 38 of any convenient construction wherein the ferrous chloride values are converted to precipitated iron, usually in the form of ferric hydroxide. The ferric hydroxide precipitates from the hydrochloric acid, is separated therefrom in any convenient manner, typically filtration, and, after washing to remove entrained acid, is recovered by line 40.

The ferric hydroxide thereafter is passed to a drier 42 wherein it is dried and converted to ferric oxide in conventional manner which is recovered by line 44. The product ferric oxide is substantially pure and may be used directly to produce iron pellets.

After separation of the ferric hydroxide, the hydrochloric acid, containing dissolved gangue materials is passed by line 46 to a flash evaporator 48 of any convenient construction, wherein hydrogen chloride is flashed from the acid. The flashing operation is continued until substantially all of the hydrogen chloride content of the hydrochloric acid fed by line 46 has been flashed off. The residual material is gangue chlorides which are discarded by line 50.

The hydrogen chloride gas is removed from the flash evaporator 48 by line 52 and is passed to a dissolver 54 wherein concentrated hydrochloric acid is formed therefrom by dissolving in water fed by line 56. Typically, the formation of the concentrated hydrochloric acid is carried out in two stages, first forming a 20% HCl solution and then second concentrating the same to provide the 35 to 37% HCl solution.

The concentrated hydrochloric acid passes from the dissolver 54 by line 58 to the hydrochloric acid inlet feed line 14 for the leacher 12. Any additional hydrochloric acid required to make up any minor losses from the system may be fed by line 60 to the inlet feed line 14.

Figure 2:
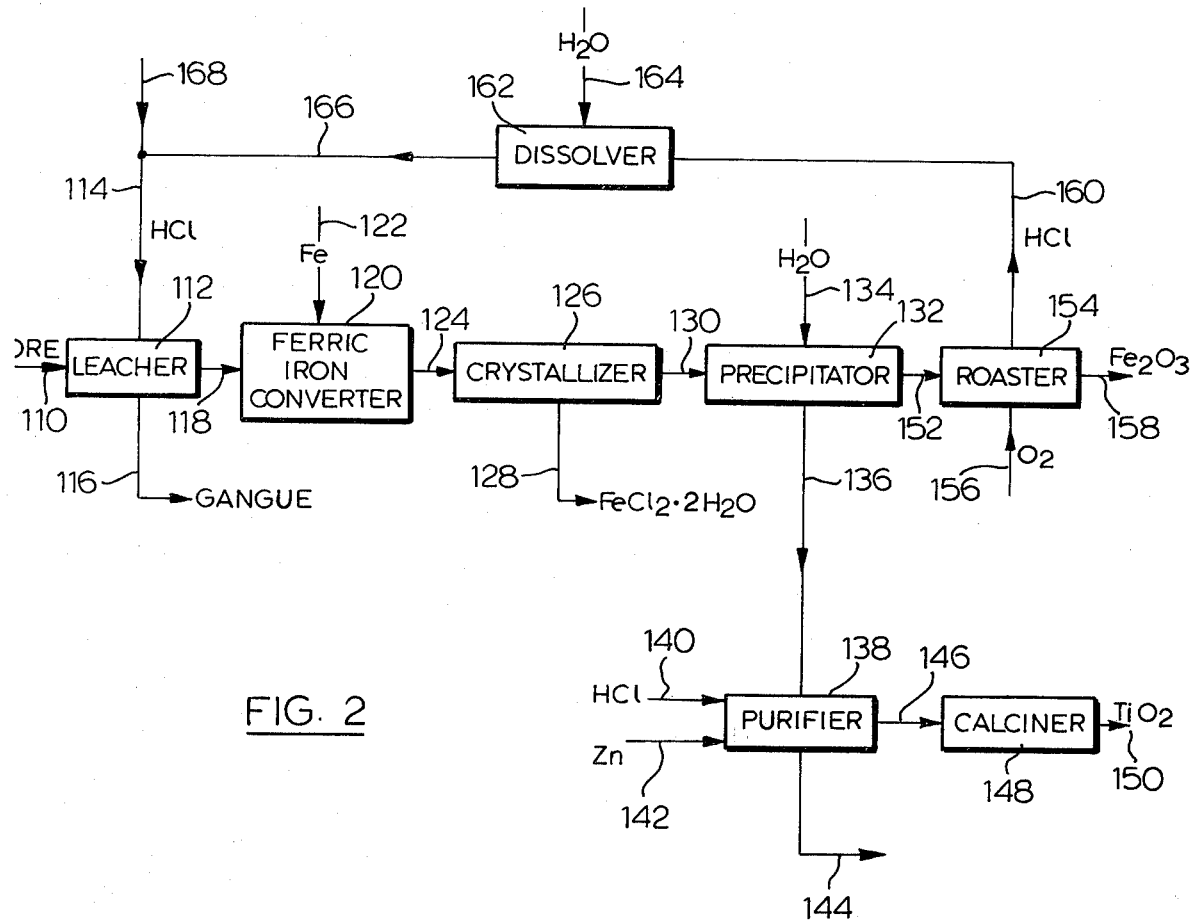
FIG. 2 is a schematic flow sheet of one embodiment of the invention.

Turning now to consideration of FIG. 2, ilmenite ore in particulate form is fed by line 110 to a leacher 112 wherein the particulate ore is contacted by concentrated hydrochloric acid of concentrations from 35 to 37% HCl fed by line 114 to the leacher 112. The quantity of hydrochloric acid fed by line 114 and the conditions of leaching are the same as those described above for the leaching carried out in leacher 12 in FIG. 1.

The resultant leach liquor, after separation from gangue materials removed in line 116, passed by line 118 to a ferric iron converter 120. Powdered iron is fed by line 122 to the aqueous solution of titanium chlorides, ferric chloride and ferrous chloride in the ferric iron converter 120. The aqueous solution is maintained at an elevated temperature, typically around 60°C, and the quantity of iron fed by line 122 is generally up to about 10% in excess of the quantity required to convert all the ferric iron to ferrous iron.

The hot solution from the ferric iron converter 120 passes by line 124 to a crystallizer 126 wherein the aqueous solution is cooled, causing crystallization of a substantial proportion of the ferrous chloride content of the solution, the ferrous chloride being separated from the mother liquor and being removed in the form of the dihydrate by line 128.

The resulting mother liquor, having a considerably decreased ferrous chloride content and a decreased bulk volume due to the removal of water, typically about 25% of the bulk, as water of crystallization of the ferrous chloride, is fed by line 130 to a precipitator 132.

While separate ferric iron converter vessel 120, crystallizer 126 and precipitator 132 are illustrated, this is for ease of illustration and two or more of the procedures carried out in these vessels may be carried out in a single vessel.

The mother liquor fed by line 130 is mixed in the precipitator 132 with water fed thereto by line 134 to cause hydrolysis of titanium chlorides to titanium oxyhydrate. A seeding quantity of titanium oxyhydrate is added to the precipitator 132, usually along with the water fed in line 134.

Prior to mixing of the mother liquor and the water in the precipitator 132, both generally are heated to a temperature of about 95 to 100°C, to promote precipitation of a coarse product. The titanium oxyhydrate precipitate is separated from the aqueous phase, washed to remove entrained liquor, and removed from the precipitator 132 by line 136.

While the dilution of the mother liquor in the precipitator 132 is carried out at a pH conducive to deposition of titanium oxyhydrate but inhibiting to the deposition of other metal compounds, nevertheless small amounts of ferric hydroxides may be precipitated. These small quantities of ferric hydroxides are removed by leaching the precipitate in a purifier 138 using hydrochloric acid fed by line 140 in the presence of zinc or aluminum fed by line 142. The resulting aqueous phase containing the ferric iron contamination is removed by line 144.

The substantially pure titanium oxyhydrate is passed by line 146 to a calciner 148 wherein the material is converted by heating at a temperature of about 700 to 1000°C to pigment grade anatase or rutile $TiO_2$, which is removed by line 150. As in the case of the embodiment of FIG. 1, the product titanium dioxide recovered from the ilmenite ore in this way is at least 99.5% pure $TiO_2$, is of pigment grade and therefore requires no further processing.

The aqueous phase resulting from separation of the titanium oxyhydrate is passed by line 152 to a roaster 154 wherein the solution after mixing with the effluent solution in line 144, if desired, is evaporated to dryness and the ferrous chloride, along with the ferrous chloride in line 128 is roasted at high temperature in the presence of oxygen or air fed by line 156, resulting in the production of ferric oxide, which is removed by line 158, and hydrogen chloride gas, which is removed by line 160.

The gaseous hydrogen chloride in line 160 is passed to a dissolver 162 wherein the hydrogen chloride is contacted with water fed by line 164 to form concentrated hydrochloric acid in line 166. Generally, the concentrated hydrochloric acid in line 166 is formed in two steps, 20% HCl hydrochloric acid first being formed and then being converted to 35 to 37% HCl hydrochloric acid.

The quantity of hydrochloric acid in line 166, under ideal conditions, corresponds to the quantity originally fed to the leacher 112 by line 114. However, losses of hydrogen chloride may occur, and the stoichiometric requirement of concentrated hydrochloric acid for line 114 may be provided by addition of concentrated hydrochloric acid by line 168 to the concentrated hydrochloric acid in line 166.

Thus, the process of the present invention results not only in the economic recovery of substantially pure titanium dioxide and ferric oxide from ilmenite, but also in a closed cycle of hydrochloric acid use.

The process of the present invention, through its recycle of acid, early elimination of gangue materials, minimal use of heat, and operation under conditions resulting in the direct recovery in high yield of pigment grade titanium dioxide results in the recovery of pigment grade $TiO_2$ from ilmenite and similar ores considerably more cheaply than the prior art processes.

EXAMPLES

EXAMPLE 1

Samples of an ilmenite ore having a $TiO_2$ content of 30.3% and a total iron content of 36.6% was subjected to leaching with hydrochloric acid at a rate of 240 mls of concentrated hydrochloric acid per 100 gms of ore. The balance of ore was made up of silicates, alumina, lime, magnesia, sulphur and minor quantities of manganese, chromium and vanadium oxides.

The ore in two differing sizes, 48 mesh and 100 mesh, was mixed with hydrochloric acid and left to react over an extended period of time. Experiments using concentrated (36% HCl) hydrochloric acid and 30% HCl hydrochloric acid were carried out, and the concentrated hydrochloric acid leach experiments were carried out at room temperature (maintained between 20 and 25°C) and at an elevated temperature of 45°C.

Samples were withdrawn from time to time and the quantity of titanium and iron values extracted from the ore was determined in conventional manner. The results are reproduced in the following Tables IA and IB:

TABLE 1A

| Time (days) (temperature 20-25°C) | % Ti Extracted | | | | % Fe Extracted | | | |
|---|---|---|---|---|---|---|---|---|
| | -48 mesh 36%HCl | -100 mesh 36%HCl | -48 mesh 30%HCl | -100 mesh 30%HCl | -48 mesh 36%HCl | -100 mesh 36%HCl | -48 mesh 30%HCl | -100 mesh 30%HCl |
| 2 | | 29 | | 13 | | 40 | | 30 |
| 3 | 32 | | 18 | | 41 | | 32 | |
| 5 | | 48 | | 28 | | 50 | | 47 |
| 6 | 44 | | | | 55 | | | |
| 7 | | 49 | 28 | 30 | | 50 | 45 | 48 |
| 8 | 55 | | | | 55 | | | |
| 9 | | 54 | | 30 | | | | 52 |
| 10 | 59 | | 39 | | 57 | | 62 | |
| 12 | | 58 | | 35 | | 52 | | 58 |
| 13 | 62 | | | | 58 | | | |
| 14 | 64 | | 40 | 40 | | | 65 | 59 |
| 15 | 65 | | | | 59 | | | |
| 16 | | 68 | | 42 | | | | |
| 17 | 66 | | 47 | | 60 | | | 61 |
| 20 | | 70 | | | | | | |

The results of the above Table IA demonstrate that superior extraction of titanium values from the ore is obtained using concentrated hydrochloric acid in accordance with the present invention as compared with less than concentrated acid (30% HCl). The extraction of iron values, however, is substantially unchanged by changes in acid strength.

It will be seen from Table 1B that when the leaching temperature is increased from room temperature to 45°C, the quantity of titanium extracted achieves a peak and falls. This is due to the formation of titanium dioxide which was observed as a fine white precipitate. In contrast, the quantity of iron extracted at the higher temperature was markedly increased.

Thus, from Tables 1A and 1B, while the experiments were not continued to leach of at least 80% of both the titanium and iron values from the ilmenite, nevertheless it is apparent that the parameters of concentrated hydrochloric acid and approximately room temperature are both essential to the efficient extraction of both titanium and iron values from ilmenite.

TABLE 1B

| Time (days) (HCl= 36%) | % Ti Extracted | | | | % Fe Extracted | | | |
|---|---|---|---|---|---|---|---|---|
| | -48 mesh 20°C | -100 mesh 20°C | -48 mesh 45°C | -100 mesh 45°C | -48 mesh 20°C | -100 mesh 20°C | -48 mesh 45°C | -100 mesh 45°C |
| 1 | | | 18 | 25 | | | 22 | 40 |
| 2 | | 30 | 29 | 39 | | 39 | 35 | 52 |
| 3 | 35 | | 30 | 40 | 41 | | 37 | 53 |
| 4 | | | 30 | 42 | | | 39 | 65 |
| 5 | | 49 | 31 | 44 | | 50 | 48 | 68 |
| 6 | 43 | | 32 | 40 | 53 | | 55 | 72 |
| 7 | | 50 | 35 | 40 | | 50 | | 79 |
| 8 | 55 | | 38 | 40 | 53 | | 67 | 80 |
| 9 | | 55 | 40 | 41 | | | 72 | 84 |
| 10 | 60 | | | | 56 | | | |
| 11 | | 60 | | | | | | |
| 12 | | | 42 | 36 | | 55 | 72 | 82 |
| 13 | 65 | | 42 | 37 | 59 | | 77 | 85 |
| 14 | | | 41 | | | | 80 | 88 |
| 15 | 69 | | 40 | 35 | 60 | | 80 | 88 |
| 16 | | 70 | | | | 59 | | |
| 17 | 69 | | | | 60 | | | |
| 20 | | 71 | | | | | | |

EXAMPLE 2

Samples of an ilmenite ore having a nominal 100 mesh size, with 90 to 95% passing a 100 mesh screen and less than 50% 325 mesh were prepared by grinding ore in a rod mill.

The experiments set forth in Table 1B were repeated using this 100 mesh ore at 5C and 20 to 25C and using 36% HCl, at a rate of about 270 mls of concentrated hydrochloric acid per 100 gms of ore. The results are reproduced in the following Table II:

TABLE II

| Time (days) | % Ti Extracted | | % Fe Extracted | |
|---|---|---|---|---|
| | 5°C | 20°C | 5°C | 20°C |
| 1 | | 20 | | 35 |
| 2 | | 31 | | 50 |
| 3 | 21 | | 39 | |
| 6 | 24 | 42 | 44 | 62 |
| 7 | | 49 | | |
| 9 | 32 | 59 | 50 | 70 |
| 13 | 33 | 60 | 53 | 72 |
| 15 | 35 | 61 | 55 | |
| 16 | | | | 76 |
| 18 | 39 | | 55 | |
| 19 | | 65 | | 80 |
| 21 | | 70 | | 81 |

It will be seen from these results that the use of leaching temperatures below those critical to the present invention yields poor extraction of titanium and iron values from the ore.

EXAMPLE 3

Samples of the ilmenite ore of 100 mesh specified in Example 2 were subjected to treatment, first at about 1000C for 2 hours in excess air flowing over the ore, and then the ore was reduced with a $CO/CO_2$ mixtures (20% CO, 80% $CO_2$) at a temperature of about 1000C for 1 hour. The ore was leached with concentrated hydrochloric acid at a rate of 270 mls for each 100g sample at 20 to 25C for 7 days. At the end of that period it was found that 73% of the $TiO_2$ had been extracted, indicating improved extraction with this pretreatment.

EXAMPLE 4

A countercurrent leaching operation was carried out by passing 720 mls of concentrated hydrochloric acid countercurrent to 300 gms specified in the ilmenite ore of Example 2. 48 hour cycles were used and at the end of each cycle the quantity of iron and titanium removed from the ore was determined. The results are reproduced in the following Table III:

TABLE III

| Cycle | % Ti Extracted | % Fe Extracted |
| --- | --- | --- |
| 1 | 51.5 | 54.2 |
| 2 | 97.7 | 97.7 |
| 3 | 98.7 | 97.7 |
| 4 | 99.4 | 98.1 |

It will be seen therefore that by using a countercurrent contact operation high extraction yields of both titanium and iron are realized.

EXAMPLE 5

A leach solution containing 100 g/l of $TiO_2$ and 115 g/l of total iron prepared in accordance with the procedure outlined in Example 4 was heated to about 60C and contacted with gaseous sulphur dioxide to reduce the ferric iron values to ferrous iron. An equal volume of water also was heated to 60C and about 1% of separately prepared titanium oxyhydrate seed was added thereto. The solutions were mixed and maintained under a sulphur dioxide atmosphere. The mixture was heated to about 95C and maintained at that temperature for about 1 hour.

A substantially white precipitate was separated from the mother liquor, washed to remove entrained material and dried at about 105C. The resulting titanium oxyhydrate analysed 70.4% $TiO_2$, 23.4% $H_2O$, 3.54% S, 0.08% total Fe, 1.84% Cl, 0.16% $P_2O_5$ and a complete absence of CaO, MgO, potassium and heavy metal elements other than iron. Upon heating the titanium oxyhydrate at high temperature there was obtained a white product which analysed 99.42% $TiO_2$.

It will be seen that a substantially pure $TiO_2$ product is obtained by utilizing the leaching and hydrolysis operations of the present invention.

EXAMPLE 6

3 l. of a leach solution containing 82 g/l. of $TiO_2$ and 89 g/l. of total iron prepared in accordance with the procedure outlined in Example 4 was heated to about 60C. 113.5g. of iron powder was added to the heated solution which was maintained at 60C for about 1 hour. Thereafter the solution was cooled to room temperature (20 to 25C) resulting in crystallization of ferrous chloride dihydrate and leaving 2290 ml. of mother liquor (a decrease of 710 ml. or over 20% of the original volume) containing 104 g/l. $TiO_2$, 47 g/l. of total iron exclusively as $Fe^{++}$ and 3.9 g/l. of $Ti^{+++}$.

The crystallized and separated ferrous chloride was washed with concentrated hydrochloric acid, resulting in 575 g. of ferrous chloride containing 32.7% total iron and 41.9% chlorine. The aqueous phase from the washing had a volume of 3450 ml and contained 21 g/l. of total iron of which 18 g/l. was $Fe^{++}$, 5 g/l. of $TiO_2$ and no detectable $Ti^{+++}$.

The mother liquor from the ferrous chloride crystallization was hydrolyzed using water in the procedure of Example 5 but omitting the sulphur dioxide and the resulting titanium oxyhydrate was found to contain 0.023% total iron.

Modifications are possible within the scope of the invention.

What I claim is:

1. A process for the recovery of titanium dioxide from ilmenite ore which comprises contacting said ore or concentrate thereof in particulate form with concentrated hydrochloric acid at a temperature of from about 15 to about 30C to solubilize and leach from said ore or concentrate at least 80% of the titanium and iron values thereof, said hydrochloric acid being present in such a quantity as to provide at least 2 moles of HCl per mole of ferrous iron, at least 3 moles of HCl per mole of ferric iron and at least 4 moles of HCl per mole of titanium in the ore or concentrate, separating the resulting leach liquor from residual solid material, converting substantially any ferric iron present in said leach liquor to ferrous iron to provide an aqueous solution of titanium chlorides and ferrous chloride, hydrolyzing said titanium chlorides and depositing from said aqueous solution titanium oxyhydrate while inhibiting the deposition of other metal hydroxides, separating said deposited titanium oxyhydrate from the mother liquor, washing said separated material free from entrained mother liquor, drying the washed material and converting said dried titanium oxyhydrate to titanium dioxide.

2. The process of claim 1 wherein said ore is contacted with said acid to solubilize and leach from said ore at least 95% of the titanium and iron values thereof.

3. The process of claim 1 wherein said ore is contacted with said acid in countercurrent manner.

4. The process of claim 1 wherein said ore is leached at a temperature of about 20 to 25C.

5. The process of claim 1 wherein said ferric iron values of said leach liquor are converted to ferrous iron values by the use of sulphur dioxide.

6. The process of claim 1 wherein said titanium chlorides are hydrolyzed and said titanium oxyhydrate is precipitated by mixing with said aqueous solution from 1 to 3 volumes of water for each volume of aqueous solution, including a seeding amount of titanium oxyhydrate in the resulting mixture and heating the seeded mixture to a temperature of from 80 to 100C.

7. The process of claim 6 wherein said seeding amount of titanium oxyhydrate is added with said water to said aqueous solution.

8. The process of claim 7 wherein said seeding amount is about 1 to 2%.

9. The process of claim 1 wherein said ore has a particle size distribution of 90 to 95% 100 mesh and less than 50% 325 mesh.

10. The process of claim 1 including the further steps of recovering iron values from said mother liquor and providing thereby hydrochloric acid, recovering substantially all of the hydrogen chloride values of the latter hydrochloric acid and utilizing said recovered hydrogen chloride values in concentrated hydrochloric acid used to contact further ore or concentrate.

11. The process of claim 1 wherein said dried titanium oxyhydrate is converted to titanium dioxide by heating the titanium oxyhydrate to a temperature from 700 to 1000C.

12. The process of claim 1 wherein said dried titanium oxyhydrate is converted to pigment grade anatase.

13. The process of claim 1 wherein said dried titanium oxyhydrate is converted to pigment grade rutile.

14. The process of claim 1 wherein said conversion of ferric iron to ferrous iron and said hydrolysis of titanium chlorides are achieved by heating said leach liquor at a temperature of about 60 to 75C in the presence of sulphur dioxide for a time sufficient to convert substantially all of the ferric iron content of the leach liquor to ferrous iron, heating water containing a seeding amount of titanium oxyhydrate to a temperature of about 60 to 75C, mixing said heated leach liquor after said conversion of ferric iron to ferrous iron with said water with said heated water in the proportion of from 1 to 3 volumes of water for each volume of liquor to provide a seeded mixture and heating said seeded mixture at a temperature of about 80 to 100C while maintaining a sulphur dioxide atmosphere until substantially all of the titanium values of the leach liquor have precipitated as titanium oxyhydrate.

15. The process of claim 14 wherein said seeded mixture is heated at a temperature of about 95C for about 1 hour.

16. The process of claim 1 wherein said ferric iron values of the leach liquor are converted to ferrous iron values by adding powdered metallic iron to the leach liquor in a quantity at least stoichiometrically sufficient to convert the ferric iron to ferrous iron in accordance with the equation:

$$2FeCl_3 + Fe \rightarrow 3FeCl_2$$

and reacting said ferric iron with the powdered iron at an elevated temperature below the boiling point of the leach liquor.

17. The process of claim 16, wherein said elevated temperature is about 50 to 95C.

18. The process of claim 17, wherein said elevated temperature is about 60C and said reaction is carried out for about 1 hour.

19. The process of claim 16, wherein said powdered iron is used in a quantity sufficient to convert all said ferric iron to ferrous iron and up to 1% of the quatravalent titanium to trivalent titanium.

20. The process of claim 16, wherein said leach liquor after the substantial conversion of ferric iron to ferrous iron and before the hydrolysis is cooled to cause crystallization of ferrous chloride dihydrate from said leach liquor, and said ferrous chloride dihydrate is separated from the resulting mother liquor.

21. The process of claim 20, including the further steps of recovering iron values from the mother liquor from the separation of titanium oxyhydrate and providing thereby hydrochloric acid, recovering substantially all of the hydrogen chloride values of the latter hydrochloric acid, converting the separated ferrous chloride dihydrate into iron oxide and hydrogen chloride and utilzing the latter hydrogen chloride and the hydrogen chloride recovered from said hydrochloric acid to form concentrated hydrochloric acid for contacting further ore or concentrate.

22. The process of claim 21, wherein said quantity of hydrogen chloride obtained from the ferrous chloride dihydrate and from said hydrochloric acid and used to form recycled concentrated hydrochloric acid is substantially the same quantity as is present in the concentrated hydrochloric acid used to contact the ore or concentrate and any hydrogen chloride values lost from the system are replenished by mixing the appropriate amount of further concentrated hydrochloric acid with the recycle concentrated hydrochloric acid.

23. The process of claim 1 wherein said hydrolysis of said titanium chlorides, deposition of titanium oxyhydrate and inhibition of deposition of other metal hydroxides is achieved by mixing said aqueous solution of titanium chlorides and ferrous chloride with water to dilute the aqueous solution to a pH of about 0 to about 0.5.

* * * * *